May 21, 1935.                K. F. GALLIMORE                2,002,480
                      DRIVE FOR MACHINE TOOL ELEMENTS
                           Filed Feb. 8, 1932            3 Sheets-Sheet 1
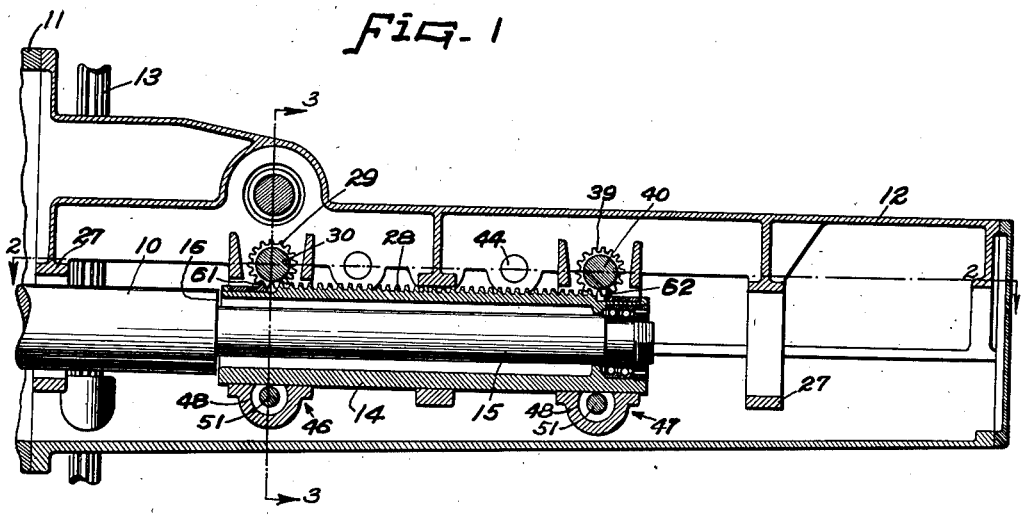
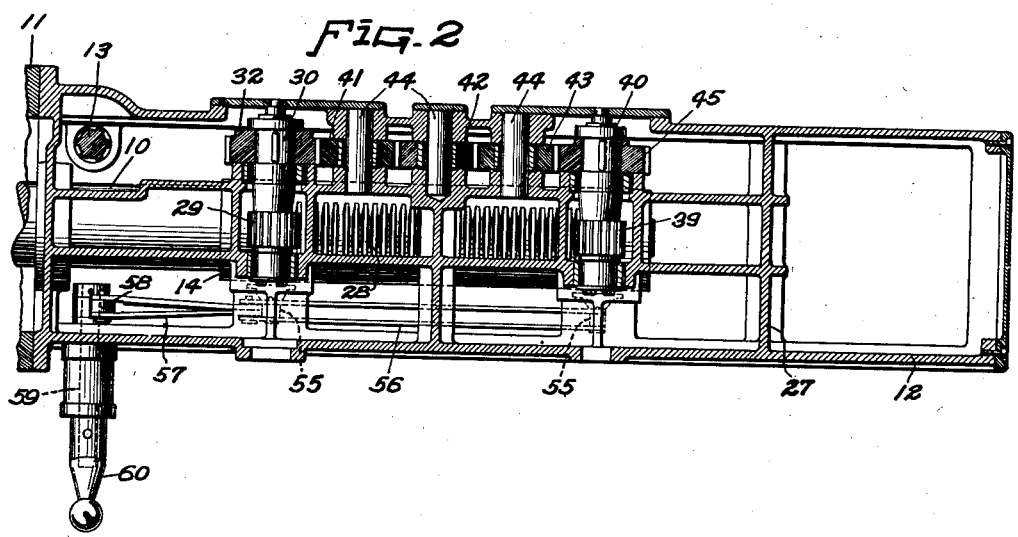
Inventor
Keith F. Gallimore
By Chindahl, Parker & Carlson
Attorneys May 21, 1935.  K. F. GALLIMORE  2,002,480
DRIVE FOR MACHINE TOOL ELEMENTS
Filed Feb. 8, 1932  3 Sheets-Sheet 2
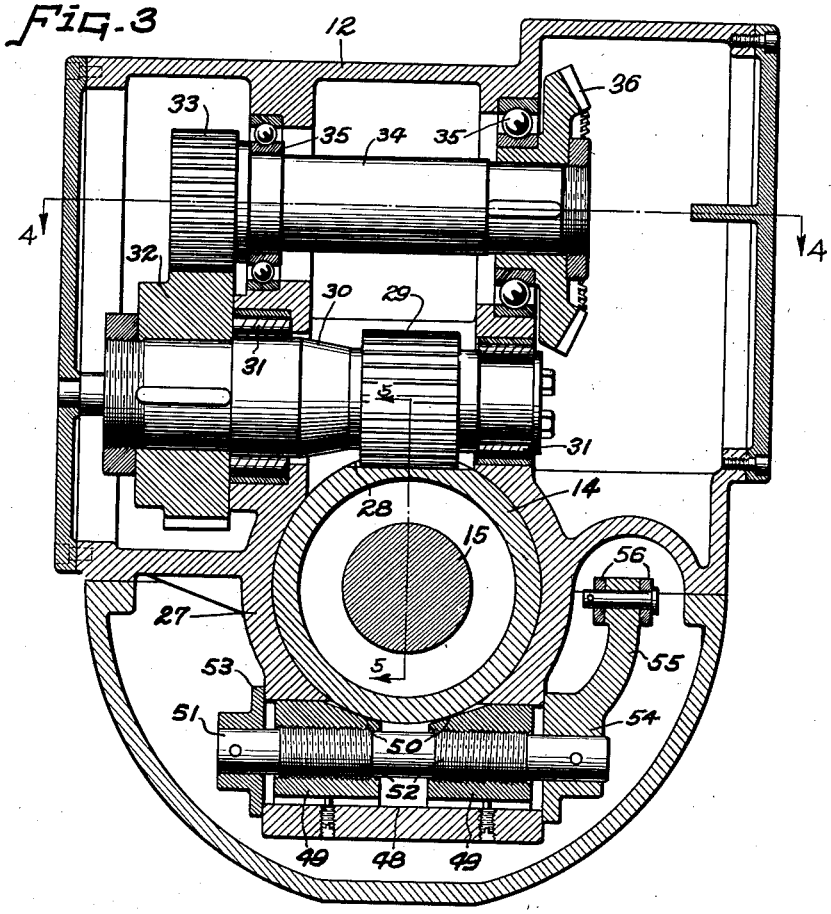
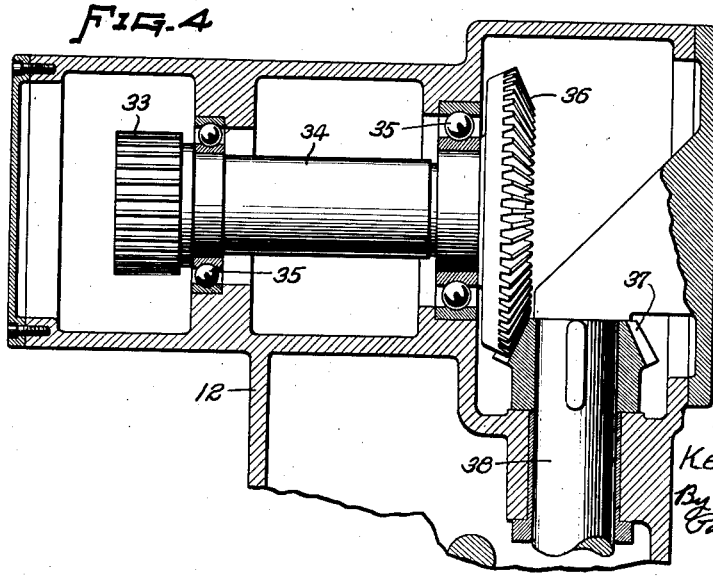
Inventor
Keith F. Gallimore
By Chindahl,
Parker & Carlson
Attorneys May 21, 1935.   K. F. GALLIMORE   2,002,480
DRIVE FOR MACHINE TOOL ELEMENTS
Filed Feb. 8, 1932   3 Sheets-Sheet 3
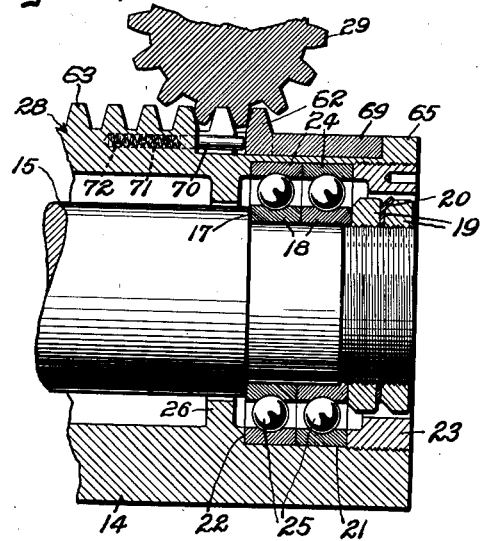
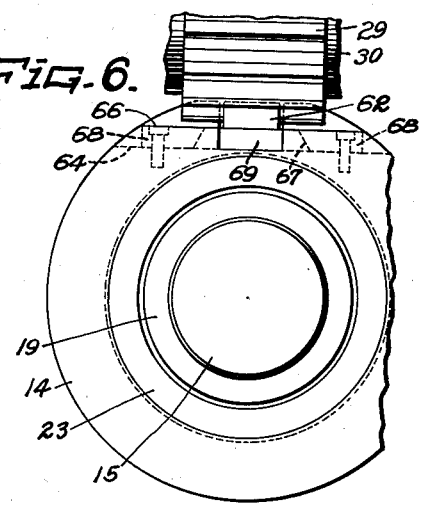
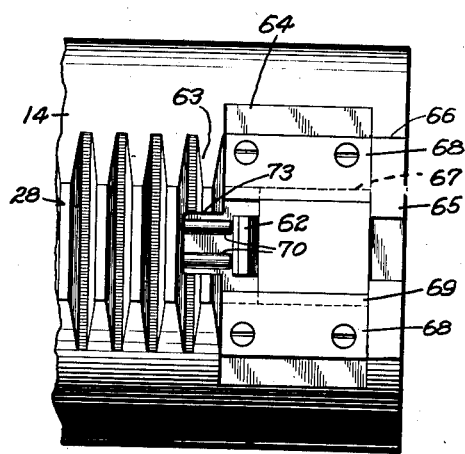
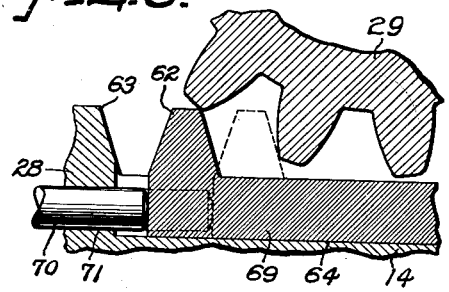
Inventor
Keith F. Gallimore
By Chindahl, Parker & Carlson
Attorneys Patented May 21, 1935

2,002,480

UNITED STATES PATENT OFFICE 2,002,480

DRIVE FOR MACHINE TOOL ELEMENTS

Keith F. Gallimore, Fond du Lac, Wis., assignor to Giddings & Lewis Machine Tool Co., Fond du Lac, Wis., a corporation of Wisconsin Application February 8, 1932, Serial No. 591,739

22 Claims. (Cl. 29—26)

The present invention relates to a new and improved drive for machine tool elements.

One object is to provide a novel rack and pinion drive for a translatable member which affords a range of movement substantially greater than the length of the rack.

Another object is to provide novel brake means for securing the member in any desired position of translation by the rack and pinion drive.

A further object resides in the provision of a new and improved automatic safety tooth at each end of the rack for limiting the translation of the driven member in each direction without disturbing the drive connection for effecting a return movement in the opposite direction.

Further objects and advantages will become apparent as the description proceeds.

In the accompanying drawings, Figure 1 is a longitudinal vertical sectional view of a driving mechanism embodying the features of the invention.

Fig. 2 is a longitudinal horizontal sectional view taken along line 2—2 of Fig. 1.

Fig. 3 is a transverse vertical sectional view on an enlarged scale taken along line 3—3 of Fig. 1.

Fig. 4 is a fragmentary horizontal sectional view taken along line 4—4 of Fig. 3.

Fig. 5 is a fragmentary vertical sectional view of the rack and pinion drive taken along line 5—5 of Fig. 3.

Fig. 6 is a fragmentary end view of the construction shown in Fig. 5.

Fig. 7 is a fragmentary plan view of the construction shown in Figs. 5 and 6 without the pinion.

Fig. 8 is a fragmentary view on an enlarged scale of one of the automatic safety teeth of the rack.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, the invention in its broader aspects is adapted for use in connection with many different machine elements, but for purposes of illustration is shown in its preferred form as embodied in the reciprocatory feed drive for a rotatable and axially slidable spindle 10, such for example as either of the tool spindles in the horizontal boring, drilling and milling machine disclosed in my Patent No. 1,858,491, issued on May 17, 1932.

In the specific adaptation of the invention, the spindle 10 forms part of a vertically adjustable tool head comprising a casing 11. A tapered guide sleeve 12 is secured to the right side of the casing 11 and in effect forms a continuation thereof. Extending slidably through the base end of the sleeve 12, and adapted for connection to a suitable source of power (not shown) is a vertical power inlet spline shaft 13 for the tool head. The left or operative end of the spindle 10 extends into the casing 11 and is therein adapted for connection through a variable-speed rotative drive (not shown) to the shaft 13 in any vertical position of the head.

Since the spindle 10 is not only rotatable, but is also adapted to be fed axially in either direction, the right end thereof is mounted for rotation and against relative endwise movement in a feed ram 14. To this end, the spindle 10 has a reduced extension 15 defining an annular shoulder 16 at the juncture, and extending in spaced relation axially through the ram 14 which is in the form of a sleeve.

The extreme free end of the extension 15 is reduced in size to form a peripheral shoulder 17, and two inner annular raceways 18 are secured in end abutting engagement thereon against the shoulder 17 by means of two lock nuts 19 separated by a yieldable washer 20. Secured in a counterbore 21 against an internal peripheral shoulder 22 in the right end of the ram sleeve 14 by means of an annular internal nut 23, and concentrically encircling the inner raceways 18, are two end abutting outer raceways 24. Ball bearings 25 are disposed between the raceways 18 and 24. Formed in the sleeve 14 adjacent the two innermost raceways 18 and 24 is a peripheral flange 26 which with the nut 23 serves to substantially enclose the ends of the foregoing bearing structure. Thus, the spindle 10 is constrained for axial movement with the ram sleeve 14, but is freely rotatable therein.

The ram sleeve 14 is elongated to afford a solid mounting and a range of reciprocation of substantial extent, and is adapted to extend through and to be slidably supported in a plurality of spaced alined bearing brackets 27 formed integrally with the interior of the guide sleeve 12. The brackets 27 are five in number, and are so spaced that the ram sleeve 14 is always supported at spaced points by two or three thereof in any position of reciprocation.

A rack and pinion feed drive is provided for reciprocating the ram sleeve 14 and therethrough the spindle 10. This drive comprises an elongated longitudinal gear rack 28 formed on the outside of the ram sleeve 14. Meshing with the rack 28 is a pinion 29 on a transverse shaft 30 journaled in roller bearings 31 in the sleeve 12. A gear 32 is secured to the rear end of the shaft 30 and meshes with a gear 33 on the rear end of a parallel shaft 34 overhead in the same vertical plane. The shaft 34 is journaled in ball bearings 35 in the sleeve 12, and the front end thereof is connected through bevel gears 36 and 37 to a shaft 38 extending longitudinally of the sleeve 14 into the casing 11 and adapted to be connected to a suitable source of power. Preferably, the shaft 38 is connected through a variable speed drive (not shown) in series with the rotative drive for the spindle 10 to the power inlet shaft 13.

A substantial range of reciprocation is often desirable, particularly for machine elements such as the tool 10. However, it is also desirable to keep the length of the rack 28 as short as possible since an increase in the length of the rack results in an increase in the overall length of the spindle 10 and the guide sleeve 12, thus tending toward objectionable overhang of the tool head. Hence, the range of reciprocation is limited to an objectionable extent where a single drive pinion 29 is provided since obviously it can be no greater in extent than the effective length of the rack.

One of the primary features of the present invention resides in the provision of novel means, supplementing the pinion 29, for driving the feed ram sleeve 14, which affords a range of reciprocation substantially in excess of the length of the rack 28. Thus, an appreciable increase in the maximum range of reciprocation is made possible without increasing the length of the rack 28. This means (Figs. 1 and 2) comprises a plurality of pinions, including the pinion 29, for driving the rack 28, and arranged to supplant one another at various points in the reciprocation. In the present instance, two pinions are provided, one being the pinion 29 and the other being a pinion 39 on a transverse shaft 40 journaled in the sleeve 12 parallel to the shaft 30.

The pinion 39 is driven at the same speed as the pinion 29, the drive preferably being taken from the gear 32. Thus, the gear 32 is connected through a train of three horizontally alined gears 41, 42 and 43, journaled on fixed shafts 44 in the rear of the sleeve 12, to a gear 45 secured on the rear end of the shaft 40.

The pinions 29 and 39 are spaced apart substantially the full length of the rack 28 so that the range of reciprocation is approximately twice the length of the rack. In Fig. 1, the spindle 10 is shown in a position midway of its range of movement, with both pinions 29 and 39 in mesh with the rack 28. Reciprocation of the spindle 10 in either direction at the right of this position, and over a range substantially coextensive in length with the rack 28, is under the control of the pinion 39 while the pinion 29 is idle. Similarly, reciprocation over an equal range at the left is under the control of the pinion 29 while the pinion 39 is idle. Upon movement of the spindle 10 in either direction past the central position, the pinion to take control is brought into mesh with the rack 28 just before the other pinion becomes idle.

It will be seen that the pinions 29 and 39 are adapted to be simultaneously in mesh with the gear rack 28 when the latter is located in its intermediate position. Hence, the spacing of the pinions 29 and 39 is no greater than the effective length of the rack. To obtain a maximum extent of travel of the ram 14, the pinions 29 and 39 preferably are spaced apart a distance substantially equal to the effective length of the rack, but it will be understood that within the broad aspects of the invention, the pinions may be spaced any desired distance no greater than the effective length of the rack, the extent of travel of the ram 14 in any instance being equal to the effective length of the rack plus the distance between the axes of the pinions. Although the spacing of the pinions is substantially equal to the effective length of the rack, it will be understood that the spacing of the pinion axes is slightly but sufficiently less than the maximum effective length so as to insure a driving engagement for translation of the ram 14 in either direction out of its intermediate position.

Two brake mechanisms, indicated generally at 46 and 47, are available at will to clamp the feed ram sleeve 14 and hence the spindle 10 against endwise movement when the drive for the pinions 29 and 39 is disconnected. These mechanisms are associated respectively with the pinions 29 and 39, and are similarly spaced so that at least one or the other is adapted to clamp the ram sleeve 14 in any position of axial feed. Preferably, the two mechanisms 46 and 47 are alike in construction, and hence a description of the mechanism 46 (Fig. 3) associated with the pinion 29 will suffice for both; corresponding parts of the mechanism 47 however being designated by like reference characters.

The brake mechanism 46 comprises a cylindrical bore 48 formed in one of the brackets 27 in the same vertical plane as the shaft 30, and intersecting intermediate its end with the bearing surface for the ram sleeve 14. Two cylindrical brake shoes 49, formed on their adjacent ends with oppositely inclined wedge surfaces 50 for engaging the ram sleeve 14, are slidably and non-rotatably mounted in opposite ends of the bore 48. An actuating shaft 51 extends axially through the bore 48, and has two spaced threaded portions 52 of opposite lead on which the shoes 49 are adjustably mounted. Two peripheral collars 53 and 54 are secured on opposite ends of the shaft 51 and rotatably against opposite sides of the bracket 27 across the ends of the bore 48, and serve to hold the shaft against endwise movement. The front collar 54 is formed integral with an upstanding operating lever 55, actuation of which in opposite directions is effective to move the shoes 49 simultaneously respectively into and out of clamping engagement with the ram sleeve 14.

To afford means for operating the brake mechanisms 46 and 47 simultaneously, the two levers 55 are pivotally connected by a link 56, and the latter is pivotally connected at one end through a link 57 to the free end of an arm 58 on the inner end of a rock shaft 59 journaled in the front wall of the guide sleeve 12. A hand lever 60 is secured to the outer end of the shaft 59.

Another important feature of the invention resides in the provision of means in the rack and pinion drive for automatically limiting the reciprocation of the ram sleeve 14 in either and preferably both directions. In its preferred form, this means comprises two automatic safety teeth 61 and 62 respectively at opposite ends of the rack 28 for coaction with the pinions 39 and 29 at the limits of the reciprocation of the ram sleeve 14. Preferably, these teeth are alike in construction, and hence a description of the tooth 62 at the outer end of the sleeve 14 will suffice for both, with corresponding parts of the tooth 61 however being indicated by like reference characters.

Referring particularly to Figs. 5 to 8, the rack 28 is formed in the top side of the sleeve 14 with straight teeth 63, and terminates a short distance from each end of the sleeve. Formed in the sleeve 14 immediately beyond the end of the rack 28, and at a depth substantially below the roots of the teeth 63 is a flat bearing surface 64. A flange 65, on the extreme end of the sleeve 14 and flattened at 66, defines the outer end margin of the surface 64 and projects upwardly therefrom to form a stop.

Rigidly secured to the sleeve 14 on the surface 64 in parallel spaced relation to define a guideway 67 longitudinally of the rack 28 are two gib plates 68. A slide 69 is mounted for reciprocation in the guideway, and on its innermost end is rigid with the tooth 62. Two parallel pins 70 slidable in bores 71 formed longitudinally in the sleeve 14 beneath the outermost rigid teeth 63 of the rack 28 are urged outwardly by coiled compression springs 72 in the inner ends of the bores into engagement with the tooth 62 to hold the slide 69 yieldably against the stop 65.

When the slide 69 is against the stop 65, the tooth 62 constitutes the outermost tooth of the rack 28 and is spaced at the correct pitch for non-yieldable engagement by the pinion 29 upon rotation of the latter in a counter-clockwise direction to effect movement of the sleeve 14 to the right. However, the tooth 62 will, upon engagement by the pinion 29 while rotating in a clockwise direction, at the end of the reciprocation of the sleeve 14 to the left, be moved to the left, against the action of the spring-pressed pins 70, out of mesh into the position illustrated in Fig. 8 to automatically stop further movement of the sleeve regardless of whether or not the drive for the pinions 29 and 39 is disconnected. Upon further rotation, the teeth of the pinion 29 will merely continue to click past the tooth 62. To accommodate the yieldable movement of the tooth 62, it is shorter than the teeth 63, and the outermost tooth 63 is formed intermediate its ends with a notch 73, within which the pins 70 are disposed, and which is sufficient in width to receive the tooth 62.

I claim as my invention:

1. In a machine tool, in combination, an elongated horizontal casing having a plurality of spaced bearing brackets alined longitudinally thereof, an elongated horizontal sleeve slidable longitudinally in said brackets, a spindle having one end extending through said sleeve and being rotatably and non-translatably mounted therein, said sleeve being formed longitudinally with an elongated gear rack, two pinions mounted in said casing and adapted selectively to mesh with said rack, said pinions being spaced apart a distance substantially equal to the effective length of said rack, and means for driving said pinions simultaneously and at the same peripheral speed in the same direction.

2. In a machine tool, in combination, a casing having a plurality of spaced alined bearing brackets therein, an elongated ram slidable longitudinally in said brackets, a spindle rotatably and non-translatably mounted in said ram, said ram being formed longitudinally with an elongated gear rack, two pinions mounted in said casing, said pinions being spaced longitudinally of said rack and adapted to mesh selectively therewith, and means for driving said pinions in the same direction.

3. In a machine tool, in combination, a reciprocable ram, a spindle rotatably and non-translatably mounted therein, said ram being formed with an elongated gear rack, two pinions adapted selectively to mesh with said rack, said pinions being spaced apart a distance no greater than the effective length of said rack and having the same angular phase relation to said rack, and means for driving said pinions in the same direction.

4. In a machine tool, in combination, a reciprocable ram, a spindle rotatably and non-translatably mounted therein, said ram being formed with an elongated gear rack, two pinions adapted selectively to mesh with said rack, said pinions being spaced apart a distance no greater than the effective length of said rack, and means for driving said pinions, the end teeth of said rack being yieldably adjustable respectively in opposite directions out of normal position through coaction with said pinions to prevent said rack from moving out of driving engagement with said pinions at the end limits of its movement.

5. In a machine tool, in combination, an elongated translatable member, a longitudinal gear element rigid with said member, a plurality of spaced pinions mounted in position to mesh selectively with said element in different positions of said member, each two adjacent pinions being spaced apart a distance permitting simultaneous meshing engagement with said element, and means for driving said pinions at the same speed, two spaced teeth of said element each being yieldably adjustable in one direction out of normal position through coaction with said pinions to prevent said element from moving out of meshing engagement with said pinions at the end limits of its movement.

6. In a machine tool, in combination, an elongated translatable member, a longitudinal gear element rigid with said member, a plurality of spaced pinions mounted in position to mesh selectively with said element in different positions of said member, each two adjacent pinions being spaced apart a distance permitting simultaneous meshing engagement with said element, and means for driving said pinions at the same speed, one tooth adjacent one end of said element being yieldably adjustable in one direction out of normal position through coaction with one of said pinions to prevent said element from moving out of meshing engagement with said one pinion at one end limit of its movement.

7. In a machine tool, in combination, a reciprocable ram, a spindle rotatably and non-translatably mounted therein, said ram being formed with an elongated gear rack, two pinions adapted selectively to mesh with said rack, said pinions being spaced apart a distance no greater than the effective length of said rack, means for driving said pinions in the same direction, and two independent brake means mounted respectively in the same transverse planes as said pinions for securing said ram in any position of adjustment within the limits of its movement.

8. In a machine tool, in combination, an elongated translatable member, a longitudinal gear element rigid with said member, a plurality of spaced pinions mounted in position to mesh selectively with said element in different positions of said member, each two adjacent pinions being spaced apart a distance permitting simultaneous meshing engagement with said element, means for driving said pinions in the same direction, and two spaced brake means for securing said member in any position of adjustment.

9. In a machine tool, in combination, an elongated translatable member, a longitudinal gear element rigid with said member, a plurality of spaced pinions mounted in position to mesh selectively with said element in different positions of said member, each two adjacent pinions being spaced apart less than the effective length of said element, means for driving said pinions in the same direction, and two spaced independent brake means mounted respectively in the same transverse planes as said pinions for securing said member in any position of adjustment within its limits of movement.

10. In a machine tool, in combination, an elongated translatable member, a longitudinal gear element rigid with said member, a plurality of spaced pinions mounted in position to mesh selectively with said element in different positions of said member, each two adjacent pinions being spaced apart a distance permitting simultaneous meshing engagement with said element, means for driving said pinions at the same speed, two spaced teeth of said element each being yieldably adjustable in one direction out of normal position through coaction with said pinions to prevent said element from moving out of meshing engagement with said pinions at the end limits of its movement, and two spaced independent brake means mounted respectively substantially in the same transverse planes as said pinions for securing said member in any position of adjustment within its limits of movement.

11. In a machine tool, in combination, a movable member, said member being formed with an elongated gear element, a pinion mounted for engagement with said element to drive said member in opposite directions, a stop on said member, one tooth adjacent one end of said element being movable, and spring means yieldably urging said movable tooth normally into operative position against said stop, said pinion upon driving said element in one direction into one extreme end position tending to move said tooth away from said stop to limit further movement of said element in said direction while maintaining engagement for driving said element in the reverse direction.

12. In a machine tool, in combination, a reciprocable member, said member being formed with a longitudinal gear rack, and a pinion mounted for engagement with said rack, one tooth of said rack being yieldably adjustable in one direction out of a normal operative position through coaction with said pinion in one direction of drive to limit further movement of said rack in said direction of drive while maintaining engagement of said rack with said pinion for drive in the other direction.

13. In a machine tool, in combination, a reciprocable member, said member being formed with a longitudinal gear rack, and a pinion mounted for engagement with said rack, two spaced teeth of said rack each being yieldably adjustable in one direction out of normal operative position to limit movement of said rack in the same direction beyond the corresponding end limit position while maintaining the drive for returning said rack in the opposite direction.

14. In a machine tool, in combination, a ram sleeve, a spindle rotatably and non-translatably mounted in said sleeve, a longitudinal rack on said sleeve, a pinion mounted for engagement with said rack, a stop on said sleeve beyond one end of said rack, a slide movable longitudinally on said sleeve between said rack and said stop, and spring means tending to urge said slide against said stop, the last adjacent end tooth of said rack being rigid with said slide and being in normal operative position when the latter is against said stop.

15. In a machine tool, in combination, a ram sleeve, a longitudinal rack on said sleeve, a pinion mounted for engagement with said rack, a stop on said sleeve, a member movable on said sleeve, one tooth of said rack being rigid with said member, and yieldable means tending to urge said member against said stop to locate said tooth in a fixed operative position adapted to transmit a drive from said pinion to said rack in one direction.

16. In a machine tool, in combination, an elongated horizontal casing, an elongated horizontal sleeve longitudinally reciprocable in said casing, a spindle journaled in said sleeve and movable axially therewith, a longitudinal gear rack rigid with said sleeve, two stub shafts rotatably journaled in said casing and driven in the same direction, two pinions secured respectively to said shafts and meshing with said rack, said pinions being spaced apart a distance substantially equal to the effective length of said rack, two gears fixed respectively on said shaft, a plurality of idler gears connected in series between said first mentioned gears, and means for driving one of said first mentioned gears.

17. In a machine tool, in combination, an elongated casing, cylindrical bearing means in said casing, a cylindrical sleeve longitudinally slidable in said bearing means, a spindle extending into and journaled in said sleeve for axial movement therewith, said sleeve being formed externally within its cylindrical surface with an elongated gear rack out of interference with said bearing means, two gear pinions journaled in said casing and adapted selectively to mesh with said rack, said pinions being spaced apart a distance substantially equal to the effective length of said rack, and means for simultaneously driving said pinions in the same direction.

18. In a machine tool, in combination, a reciprocable ram, a spindle rotatably and non-translatably mounted therein, an elongated gear rack on said ram, two pinions adapted selectively to mesh with said rack, said pinions being spaced apart a distance substantially equal to the effective length of said rack, said ram having a range of movement equal to the effective length of said rack plus the distance between said pinions, and means for driving said pinions simultaneously in the same direction, the end teeth of said rack being yieldably adjustable respectively in opposite directions out of normal position through coaction respectively with said pinions to prevent said rack from moving out of engagement with both pinions at the end limits of its movement.

19. In a machine tool, in combination, an elongated translatable member, a longitudinal gear element rigid with said member, a plurality of spaced pinions for driving said gear element in the same direction mounted in position to mesh selectively with said element in different positions of said member, each two adjacent pinions being spaced apart a distance substantially equal to the effective length of said element, means for driving said pinions, and two spaced independent brake means mounted respectively in the same transverse planes as said pinions for securing said member in any position of adjustment within its limits of movement.

20. In a machine tool, in combination, an elongated translatable member, a longitudinal gear element rigid with said member, a plurality of spaced pinions for driving said element in the same direction mounted in position to mesh selectively with said element in different positions of said member, each two adjacent pinions being spaced apart less than the effective length of said element, means for driving said pinions, two spaced brake means for securing said member in any position of adjustment, and a single means for simultaneously operating said brake means.

21. In a machine tool, in combination, an elongated casing, an elongated translatable member mounted longitudinally within said casing, two spaced bearings in said casing for said member, a longitudinal gear rack rigid with said member, a plurality of spaced pinions journaled in said casing and adapted to mesh selectively with said rack in different positions of said member, means for driving said pinions simultaneously in the same direction, two spaced independent brake means for securing said member in any position of adjustment within its limits of movement, said two bearings and said two brake means being located respectively in the same transverse planes as said pinions, and a single means for simultaneously actuating said brake means.

22. In a machine tool, in combination, an elongated reciprocable member, a longitudinal gear element rigid with said member, a pair of spaced pinions mounted in position to mesh selectively with said element in different positions of said member and spaced apart a distance permitting simultaneous meshing engagement with said element, means for driving said pinions at the same speed and in the same direction, means for automatically limiting the extent of movement of said member to a range confined to the effective length of said element plus the distance between said pinions so that at least one of said pinions will be in mesh with said element in any position of said member, and two independent brake means mounted respectively in the same transverse planes as said pinions for holding said member against movement in any position intermediate the limits of said range.

KEITH F. GALLIMORE.